No. 753,953. PATENTED MAR. 8, 1904.
M. G. CAMERON.
COMBINED PULVERIZER AND ROLLER.
APPLICATION FILED JUNE 24, 1903.
NO MODEL.
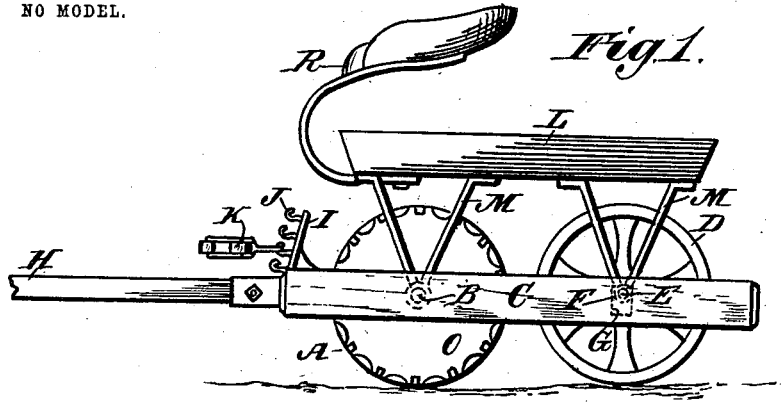
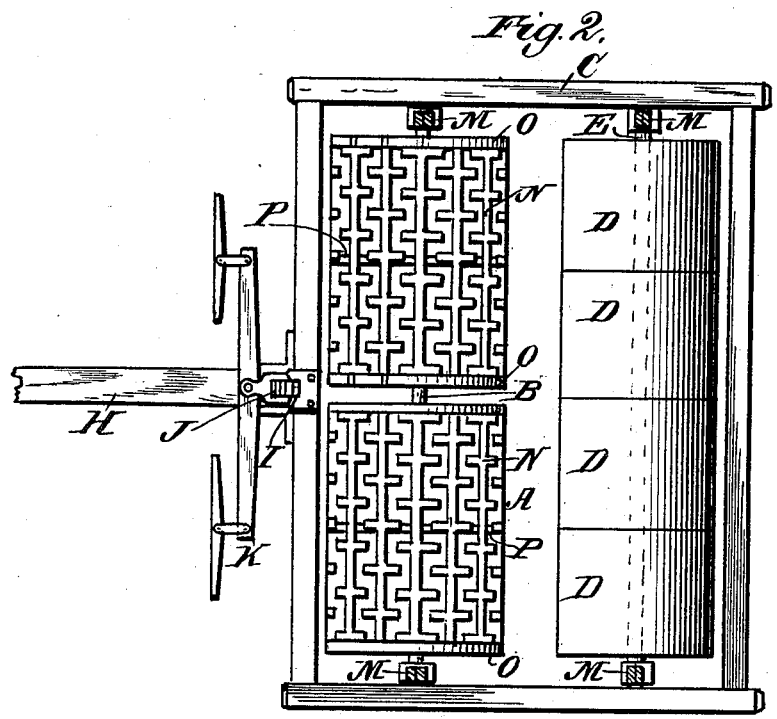
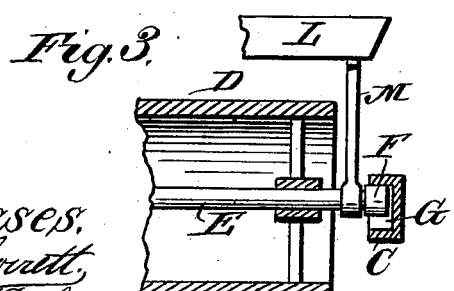
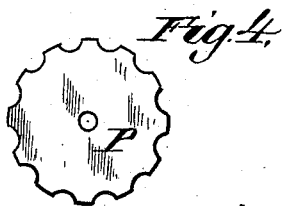
Witnesses:
Robert Everitt
C. F. Kesler
Inventor:
Malcolm G. Cameron
By
Robt. D. Johnston Jr.
Atty.

No. 753,953. Patented March 8, 1904.

UNITED STATES PATENT OFFICE.

MALCOLM G. CAMERON, OF THOMAS, ALABAMA.

COMBINED PULVERIZER AND ROLLER.

SPECIFICATION forming part of Letters Patent No. 753,953, dated March 8, 1904.

Application filed June 24, 1903. Serial No. 162,884. (No model.)

*To all whom it may concern:*

Be it known that I, MALCOLM G. CAMERON, a citizen of the United States, residing at Thomas, in the county of Jefferson and State of Alabama, have invented certain new and useful Improvements in a Combined Pulverizer and Roller, of which the following is a specification.

It is the object of my invention to provide a novel and improved clod crusher and roller combined, which comprises a pulverizing-roll for breaking or crushing up the clods of earth preparatory to planting which is mounted in a suitable frame in advance of a smooth roll, so that both the crushing and rolling can be performed at the same time and in the most expeditious and satisfactory manner.

My invention consists in the construction and arrangement of parts hereinafter set forth and described, and more particularly pointed out in the claims, reference being had to the accompanying drawings, in which—

Figure 1 is a side view of my combined pulverizing and rolling implement. Fig. 2 is a top plan view which shows more clearly the construction of the pulverizing-rolls. Fig. 3 is a detail view showing the manner of loosely mounting the smooth roll in the frame. Fig. 4 shows one of the special disks used to strengthen the pulverizing-rolls between their heads.

The same reference-letters refer to the same parts throughout.

According to my invention I mount pulverizing-rolls A upon a common shaft B, which is rigidly mounted in the forward end of a frame C in suitable bearings therefor. A series of smooth rolls D are mounted on a shaft E, whose ends are provided with antifriction-rollers F, serving as bearing-boxes for the shaft, that enter vertically-disposed slots or guides G in the frame and permit of the free vertical movement of these rolls for the purposes hereinafter described.

A tongue H is pivotally secured to the front beam of the frame C, to which also a vertically-disposed plate I is rigidly bolted. This plate, which is inclined slightly to the rear, is provided on its forward face with a series of hooks J, either integral therewith or bolted thereto in any desirable manner. To one of these hooks a doubletree K is attached. I provide a series of these hooks and dispose them in the manner shown for the purpose of utilizing the draft strain to adjust the relative pressures of the rolls A and D, and thus adapt the machine to different kinds of work, for it is evident that if the doubletree be attached to the highest hook it will exert the downward pull of the draft on the rolls A to a greater extent than when the draft strain is on one of the lower hooks, which is practically in line with the bearings for the rolls. This plate therefore acts after the fashion of a clevis, but with a much wider range of control. The free vertical movement of the rolls D in their bearings in the frame permits the pressure exerted by the pulverizing-rolls to be varied without the pressure exerted by the smooth rolls being affected thereby; otherwise if they were rigidly mounted in the frame the draft strain would act on the front rolls as a fulcrum to lighten the pressure of the rear rolls, which is a result I desire to avoid.

A weight or rock box L is supported above the rolls on bent iron bars M, which are mounted on the axles B and E adjacent to the side bars of the frame.

It is of great importance in constructing pulverizing-rolls that they should crush or break the clods of earth and not simply press them into the ground. With this object in view I preferably construct the pulverizing-rolls A out of a number of transversely-disposed bars N, suitably spaced apart and connected at their ends to heads O. Intermediate strengthening-disks P may be used, if desired, or the rolls may be constructed in any suitable manner, since their construction and arrangement form no part of this particular invention as hereinafter claimed. This bearing-surface constitutes about one-third of the face of the roll, and since it bears the entire weight of the roll it will thoroughly crush the clods, but by reason of the interstices in its bearing-face will not have a tendency to force them into the ground.

A seat R may be attached to the weight-box or to the frame in any desirable manner.

Having thus described my invention, what I claim as new, and desire to secure by Letters Patent, is—

1. As an article of manufacture, a frame, crusher-rolls journaled therein, a smooth roll mounted in said frame, a weight-box mounted on the journals of said rolls, and means to utilize the draft strain to increase the pressure on said crusher-rolls without affecting the pressure on said smooth roll.

2. In an implement of the character described, a frame, pulverizing and smooth rolls journaled therein, a weight-box mounted on the journals of said rolls, and means to increase the pressure on one of said rolls without affecting the pressure on the other.

3. In combination, a frame, crusher-rolls journaled therein, a smooth roll journaled in said frame, a weight-box and a clevis coöperating therewith to vary the pressure upon one roll without affecting the other.

4. In combination, a frame, pulverizer and smooth rolls journaled in said frame, means to vary the pressure on said pulverizing-rolls without affecting said smooth roll and a weight-box mounted on the journals of said rolls.

5. In combination, a main frame, adjustable clevis draft devices mounted thereon, crushing-rolls and smooth rolls mounted therein, and a weight-box mounted on the axes of said rolls.

6. In combination, a main frame, pulverizer and smooth rolls journaled therein, a weight-box mounted on the journals of said rolls, and a seat secured to the said weight-box.

In testimony whereof I affix my signature in presence of two witnesses.

MALCOLM G. CAMERON.

Witnesses:
J. M. STILLWELL,
L. C. HART.